(12) United States Patent
Matsuzaki et al.

(10) Patent No.: US 9,164,513 B2
(45) Date of Patent: Oct. 20, 2015

(54) WORK VEHICLE COORDINATING SYSTEM

(71) Applicant: Kubota Corporation, Osaka-shi (JP)

(72) Inventors: Yushi Matsuzaki, Sakai (JP); Hiroyuki Araki, Sakai (JP); Yasuhisa Uoya, Sakai (JP); Megumi Suzukawa, Sakai (JP); Fumio Takada, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/192,417

(22) Filed: Feb. 27, 2014

(65) Prior Publication Data

US 2014/0277899 A1 Sep. 18, 2014

(30) Foreign Application Priority Data

Mar. 13, 2013 (JP) ................................. 2013-050875

(51) Int. Cl.
*G01C 22/00* (2006.01)
*G05D 1/00* (2006.01)
*G05D 1/02* (2006.01)

(52) U.S. Cl.
CPC ............ *G05D 1/0287* (2013.01); *G05D 1/0295* (2013.01); *G05D 2201/0201* (2013.01)

(58) Field of Classification Search
CPC ...................................................... G05D 1/0287
USPC ............................................................ 701/25
See application file for complete search history.

(56) References Cited

U.S. PATENT DOCUMENTS

6,052,647 A 4/2000 Parkinson et al.
6,732,024 B2 5/2004 Wilhelm Rekow et al.

*Primary Examiner* — Maceeh Anwari
(74) *Attorney, Agent, or Firm* — The Webb Law Firm (57) ABSTRACT

Disclosed is a work vehicle coordinating system configured to carry out a ground work by a main work vehicle and an un-manned controlled sub work vehicle that follows up the main work vehicle. This system includes a main-vehicle position detection module, a sub-vehicle position detection module, a main-vehicle traveling path calculation section, a turning detection unit, a work traveling target calculation section, a turn traveling target calculation section, and a steering control section.

9 Claims, 7 Drawing Sheets

WORK VEHICLE COORDINATING SYSTEM

CROSS REFERENCE TO RELATED APPLICATION

This application claims priority to Japanese Patent Application No. 2013-050875 filed Mar. 13, 2013, the disclosure of which is hereby incorporated in its entirety by reference.

BACKGROUND OF THE INVENTION

1. Field of the Invention

The present invention relates to a work vehicle coordinating system configured to carry out a ground work by a main work vehicle and an un-manned controlled sub work vehicle that follows up the main work vehicle.

2. Description of the Related Art

From U.S. Pat. No. 6,052,647, there is known a vehicle control system configured to determine target traveling positions one after another based on actual traveling positions of a main work vehicle and to control a sub work vehicle toward the respective target traveling positions. In this vehicle control system, there are disclosed e.g. a control mode causing the sub work vehicle to follow the main work vehicle in such a manner to maintain offset amounts along the X (longitude) direction and the Y (latitude) direction set for the main work vehicle and a further control mode causing the sub work vehicle to follow up the main work vehicle along a target traveling path which is a traveling path obtained by translating a traveling path of the main work vehicle by a working width amount thereof. In this, the traveling positions of work vehicle are obtained with using a GPS (Global Positioning Satellite System). An un-manned or radio-control technique of a tractor based on traveling position information acquired by GPS is described in details in U.S. Pat. No. 6,052,647.

A follow-up control disclosed in U.S. Pat. No. 6,732,024 is designed for a work in a huge work ground, not for a work in a work ground having a relatively small area demarked by a ridge or the like, such as agricultural field. In a typical cutting/harvesting operation effected in such agricultural field, firstly, a circumference work is carried out along the boundary such as a ridge or the like. In succession, before and after a turn (180-degree direction turn) using the worked area created by the circumference work as a turning area, a forward path traveling and a reverse path traveling are effected in repetition, thus completing a ground work in a reliable and gapless manner. Further, in e.g. a rice planting operation, firstly, the circumference area along the boundary such as a ridge is left un-worked and a work on this circumference area is carried out last. In any case, in an actual work, forward and reverse work traveling and the turn traveling therebetween will be repeated. However, with the follow-up mode disclosed in e.g. U.S. Pat. No. 6,732,024 not taking turn traveling into consideration, follow-up of the turn traveling becomes difficult.

SUMMARY OF THE INVENTION

In view of the above-described state of the art, there is a need for a work vehicle coordinating system capable of functioning effectively in a mode of ground work including a work traveling and a turn traveling in a mixed state.

A work vehicle coordinating system according to the present invention configured to carry out a ground work by a main work vehicle and an un-manned controlled sub work vehicle that follows up the main work vehicle, the system comprises:

a main-vehicle position detection module detecting a position of the main work vehicle;

a sub-vehicle position detection module detecting a position of the sub work vehicle;

a main-vehicle traveling path calculation section calculating a traveling path of the main work vehicle from the position of this main work vehicle;

a turning detection unit detecting a turn traveling of the main work vehicle in a turning area to shift from one work traveling to another work traveling;

a work traveling target calculation section calculating a target traveling position at time of a work traveling of the sub work vehicle, based on a ground working width of the main work vehicle, a ground working width of the sub work vehicle, a work traveling path of the main work vehicle and a position of the sub work vehicle;

a turn traveling target calculation section calculating a turn traveling path of the sub work vehicle in the turning area based on the ground working width of the main work vehicle, the ground working width of the sub work vehicle, a turn traveling start position and a turn traveling end position of the main work vehicle and calculating also a turn traveling target position at the time of a turn traveling based on the turn traveling path; and a steering control section for un-manned controlling the sub work vehicle based on the target traveling position.

With the above-described configuration, when a ground work is to be carried out with repetition of a work traveling along a forward path and a work traveling along a reverse path across turn traveling at the opposed ends, the sub work vehicle is un-manned controlled by the steering control section, with using, as a control target, a target traveling position calculated for the work traveling with taking into consideration the ground working width of the main work vehicle and the ground working width of the sub work vehicle based on the position of the sub work vehicle itself and the traveling path of the preceding main work vehicle. With this, there is realized substantially a ground work with a ground working width adding up the ground working width of the main work vehicle and the ground working width of the sub work vehicle together. Taking a follow-up control error into consideration, there is set a certain amount of overlapping area between the ground working widths of the main work vehicle and the sub work vehicle. For the sub work vehicle during a turn traveling, the ground working width of the main work vehicle and the ground working width of the sub work vehicle need to be taken into consideration, without regards to its positional relationship with the main work vehicle or the traveling path of the main work vehicle during its turn traveling. In this regard, the sub work vehicle will be caused to travel, based on a turn traveling path calculated from a turn traveling start position and a turn traveling end position of the main work vehicle. Namely, a target traveling position will be calculated based on an appropriate turn traveling path not dependent on the traveling path of the main work vehicle, and the sub work vehicle is un-manned controlled with using this target traveling position. This eliminates such problem as a need for increasing the depth of the turning area more than necessary.

Incidentally, in consideration of such factors as circumvention of an obstacle which may be present at a work site, complicated work ground terrain, etc., the manned control is preferred for the main work vehicle. But, un-manned control using a program control or remote control may be applied to the main work vehicle.

A turn traveling is not directly related to a ground work, so a turn traveling path for the sub work vehicle can be calculated with certain amount of freedom, provided that its start point and end point are set in advance. However, considering the fact that the outside border of the turning area is formed of a ridge, a bordering wall or the like, it is important that the outside track of the work vehicle including its utility implement not exceed the depth of this turning area. For this reason, preferably, the turn traveling target calculation section calculates the turn traveling path, with a depth of the turning area being set as a limiting condition.

In order to improve the follow-up performance at the time of transition of a turn traveling to a work traveling of the sub work vehicle, according to one preferred embodiment of the present invention, ending of the turn traveling of the sub work vehicle is effected within the turning area, and follow-up by the sub work vehicle based on the work traveling path of the main work vehicle is effected before the work traveling. Namely, in this embodiment, speedy follow-up is made possible by effecting follow-up to the main work vehicle with stopping the turn traveling before a turning end position corresponding to the timing when the main work vehicle actually ends its turn traveling (a start point of a work traveling).

Unless turn traveling of the main work vehicle is ended and its work traveling is initiated, the turn traveling end point (a work traveling start point) of the sub work vehicle cannot be calculated. Therefore, according to one preferred embodiment of the present invention, the system inhibits entrance of the sub work vehicle to the turning area during turn traveling of the main work vehicle. That is, if the sub work vehicle reaches the turning area during a turn traveling of the main work vehicle, the sub work vehicle is stopped at this position and is caused to wait for completion of the ongoing turn traveling by the main work vehicle.

According to the present invention, there are obtained traveling paths of the main work vehicle and the sub work vehicle. Based on these respective traveling paths and the respective ground working widths, it is possible to grasp the area where the ground work has been effected. So, conversely, it is possible to grasp also the area where a ground work has not yet been effected. Thus, according to one preferred embodiment of the present invention, the system further comprises:

a sub-vehicle traveling path calculation section calculating a traveling path of the sub work vehicle from the position of this sub work vehicle; and an unworked position calculation section calculating a position of ground un-worked area, based on the traveling path of the main work vehicle and the traveling path of the sub work vehicle.

Detection of turn traveling of the main work vehicle can be judged from its traveling path. However, in case the work vehicle is a tractor or the like that mounts a tilling implement (a ground work implement), detection of turn traveling is possible with utilization of its operational characteristics of lifting up the tilling implement (the ground work implement) at the time of turn traveling. According to one embodiment preferred and proposed for such work vehicle, the turning detection unit is configured to detect a turn traveling of the main work vehicle based on a non-working state of a ground work implement for effecting a ground work.

Preferably, functional units for causing the sub work vehicle to track or follow up the main work vehicle should be contained within a single control unit as much as possible. To this end, according to one preferred embodiment of the present invention, the sub-vehicle position detection module and the steering control section are mounted on the sub work vehicle;

the main-vehicle position detection module, the main-vehicle traveling path calculation section, the turning detection section, the work traveling target calculation section and the turn traveling target calculation section are mounted on the main work vehicle; and the sub work vehicle and the main work vehicle are connected to enable data transmission, preferably, wireless data transmission, with each other.

With this arrangement, the sub work vehicle needs only small design change, so this arrangement is advantageous for a system using a plurality of sub work vehicles.

Further, according to a further preferred embodiment of the present invention, the sub-vehicle position detection module and the steering control section are mounted on the sub work vehicle;

the main-vehicle position detection module is mounted on the main work vehicle;

the main-vehicle traveling path calculation section, the turning detection section, the work traveling target calculation section, and the turn traveling target calculation section are provided as a separate control unit; and the separate control unit, the sub work vehicle and the main work vehicle are connected to enable data transmission, preferably, wireless data transmission, with each other.

With this arrangement, since the major functions for realizing the present invention are incorporated in the control unit provided separately from the work vehicles, the main work vehicle and the sub work vehicle require only small design changes. If the main work vehicle, the sub work vehicle and the control unit are connected to enable data transmission with each other, with utilization of WiFi, a telephone line, etc., this work vehicle coordinating system can be utilized as a cloud system.

DETAILED DESCRIPTION OF THE PREFERRED EMBODIMENTS

Before explaining a specific embodiment of a work vehicle coordinating system according to the present invention, its basic principle will be explained with reference to FIGS. 1 and 2. In this work vehicle coordinating system, a ground work is effected by a manned controlled type main work vehicle 1P and an un-manned controlled type sub work vehicle 1C that follows up (or follows) the main work vehicle 1P. In the example of work illustrated in FIG. 1, from the left rear side of the preceding main work vehicle 1P, the sub work vehicle 1C travels to track the main work vehicle 1P. A ground site to be worked is demarked by ridges. Basically, the ground work is implemented by forward and reverse straight traveling. So, firstly, a circumference traveling along the ridges is effected Then, a worked area created thereby becomes a turning area At for a turning (U-turn) effected between a forward traveling and a reverse traveling. In case a circumferential work is to be effected at the end, an area based on a presumed circumferential area becomes a turning area At.

Figure 1:
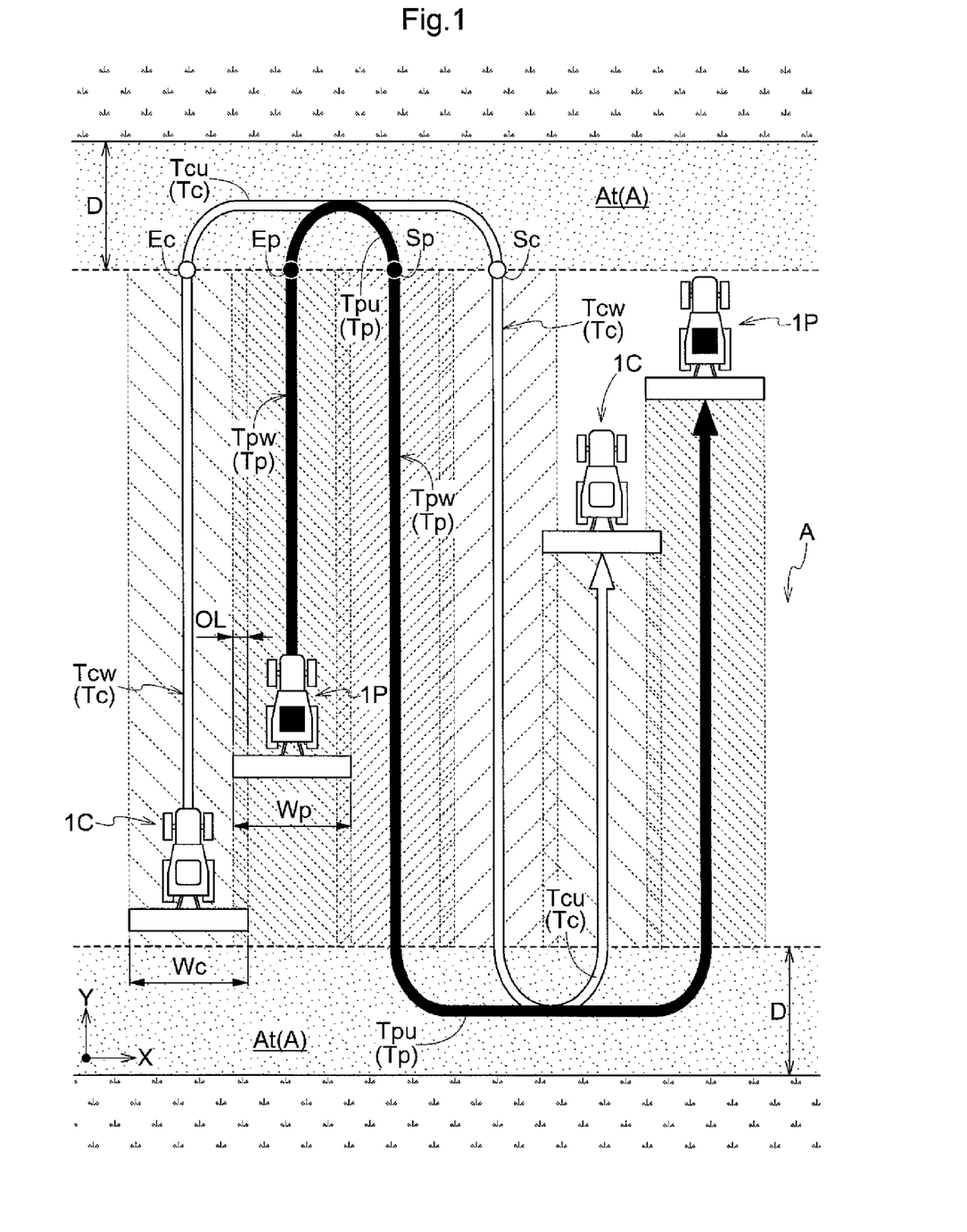
FIG. 1 is a diagram showing one example of a basic follow-up relationship between a main work vehicle and a sub work vehicle in a work vehicle coordinating system according to the present invention.
Figure 2:
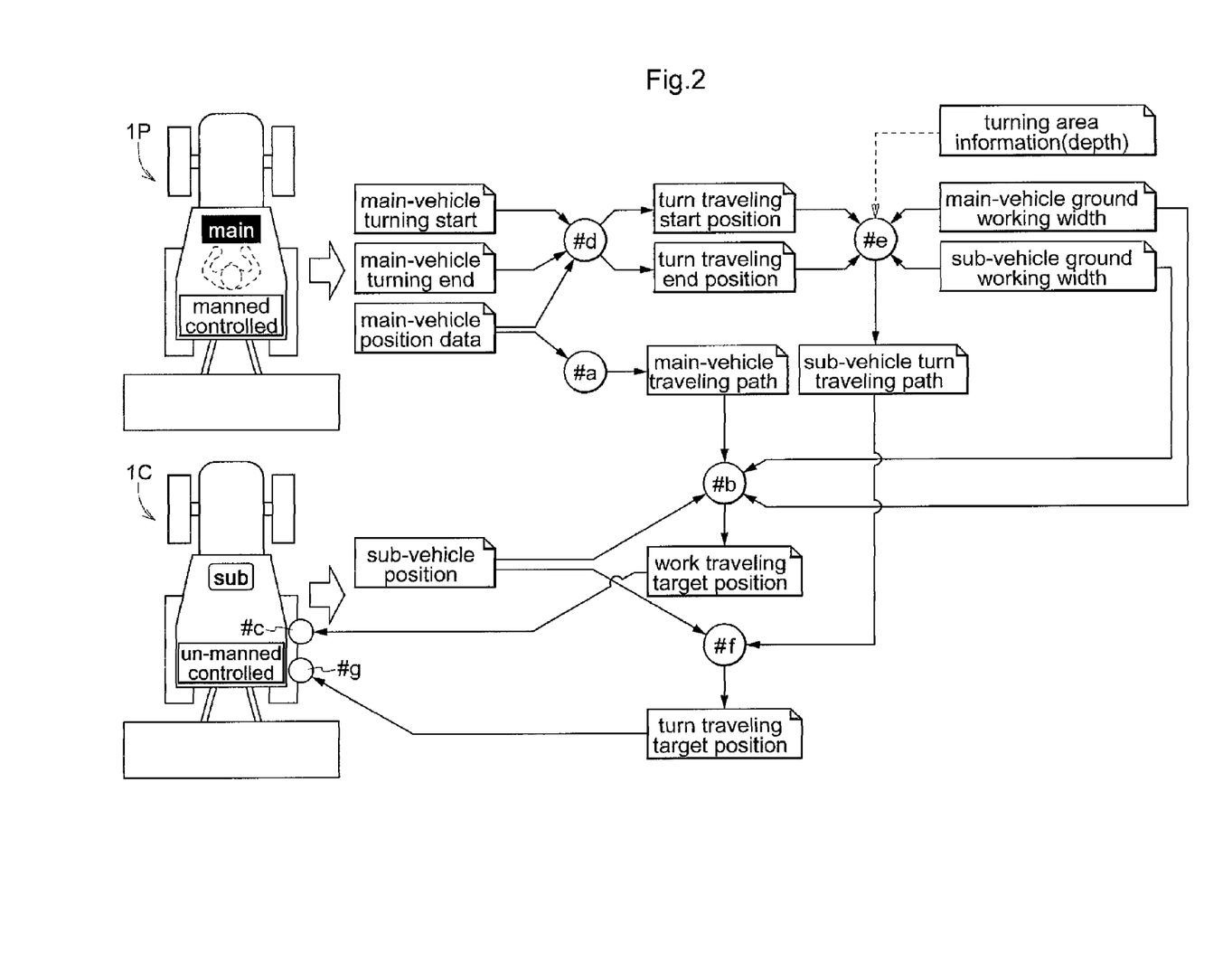
FIG. 2 is a diagram showing basic information transmission in the work vehicle coordinating system shown in FIG. 1.

In FIG. 1, a main working width Wp which is the ground working width of the main work vehicle 1P is equal to a sub working width Wc which is the ground working width of the sub work vehicle 1C. However, these may be made different from each other. A positional displacement amount along the X direction between the main work vehicle 1P and the sub work vehicle 1C is ideally: (main working width Wp+sub working width Wc)/2. However. in order to avoid left-over of working due to some follow-up error, there is provided an overlapping of e.g. about a few tens of centimeters therebetween (indicated by a mark OL in the figure). The positional displacement amount along the X direction between the main work vehicle 1P and the sub work vehicle 1C is set as a distance sufficient for avoiding mutual contact therebetween.

In the example shown in FIG. 1, a main-vehicle traveling path Tp as a traveling path of the main work vehicle 1P consists of main work traveling paths Tpw constituting straight ground work traveling between turning areas At the opposed ends and main turn traveling paths Tpu in the turning areas. And, this path Tp is created by a manned control or steering by the driver. A sub-vehicle traveling path Tc as a traveling path of the sub work vehicle 1C consists of sub work traveling paths Tcw along which the sub work vehicle 1C travels to follow up the main work vehicle 1P while effecting at the same time a ground work between the turning areas At at the opposed ends and sub turn traveling paths Tcu in the turning areas. The traveling path Tc of the sub work vehicle 1C is created by the vehicle traveling along the above path by the un-manned steering.

From the main work traveling path Tpw as a result of steering by the driver, the ground working width Wp of the main work vehicle 1P, the ground working width Wc of the sub work vehicle 1C and the current position of the sub work vehicle 1C, a target traveling position to be reached next by the sub work vehicle 1C can be calculated. With steering control using this target traveling position as the target destination, the sub work vehicle 1C effects work traveling with maintaining the preset positional relationship with the main work vehicle 1P. The main turn traveling path Tpu which is traveling of the main work vehicle 1P in the turning area At is created by steering by the driver. In this, the driver will steer/control the vehicle so as to shift to the next work traveling with precision, taking into consideration the ground working width Wp of the main work vehicle 1P and the ground working width Wc of the sub work vehicle 1C. In the course of this, at the turning area At, the following sub work vehicle 1C calculates the sub turn traveling path Tcu irrespectively of the main turn traveling path Tpu of the main work vehicle 1P and is un-manned controlled (radio-controlled) based on this sub turn traveling path Tcu. The sub turn traveling path Tcu can be configured as a connection between an end position Ec of the sub work traveling path Tcu corresponding to an end position Ep of the main work traveling path Tpw and a start position Sc of the sub work traveling path Tcw corresponding to a start position Sp of the main work traveling path Tpw. In actuality, the sub turn traveling path Tcu will be limited by a depth D of the turning area At. So, this depth D of the turning area At needs to be set as a limiting condition. In case the main work vehicle 1P has effected a circumferential work traveling and created a ground work completed turning area At prior to coordinated traveling by the main work vehicle 1P and the sub work vehicle 1C, this ground working width Wp will be provided as the depth D of the turning area At. Conversely, in case coordinated traveling by the main work vehicle 1P and the sub work vehicle 1C is effected first and then the main work vehicle 1P is to effect a circumferential work traveling, the depth D of the turning area At may be set in advance, with consideration to the ground working width Wp.

The end position Ep and the start position Sp of the main work traveling path Tpw can be detected from the main work traveling path Tpw. However, in the case of a type of work vehicle configured such that its ground work is interrupted at the time of turn traveling, these positions can be detected also, based on an interruption start timing and an interruption end timing of this ground work.

The main work vehicle 1P and the sub work vehicle 1C respectively mount a position detection module comprised of a GPS sensor and/or a position detection sensor including a direction sensor, and a traveling distance sensor in combination, so that real-time traveling positions of the main work vehicle 1P and the sub work vehicle 1C can be detected and recorded. And, by plotting the position detection data of the main work vehicle 1P, the traveling path Tp of the main work vehicle 1P can be calculated, and by plotting the position detection data of the sub work vehicle 1C, the traveling path Tc of the sub work vehicle 1C can be calculated. Incidentally, the operations for calculating the traveling path Tp of the main work vehicle 1P and the traveling path Tc of the sub work vehicle 1C from the position detection data may be effected in a butch manner when needed or may be effected subsequently with a delay of one or a few days.

Next, with reference to FIG. 2, there will be explained data flows between the manned controlled main work vehicle 1P and the un-manned controlled work vehicle 1C. Here, the main work vehicle 1P generates main-vehicle position data indicative of a position of the main work vehicle 1P, main turning starting data indicative of a start timing of a turn traveling (an end timing of a work traveling), and main turning ending data indicative of an end timing of a turn traveling (a start timing of a work traveling). The sub work vehicle 1C has a steering control function for generating sub-vehicle position data indicative of a position of the sub work vehicle 1C and automatically controlling the sub work vehicle 1C based on target traveling position data provided thereto. Also, turning area information including data of e.g. a position of a ridge as the border line of a ground to be worked, a depth D of the turning area At, main-vehicle ground working width data indicative of the ground working width Wp of the main work vehicle 1P, and sub-vehicle ground working width data indicative of the ground working width We of the sub work vehicle 1C are recorded in a control unit (a computer system) constituting the work vehicle coordinating system. Alternatively, however, this control unit can be mounted on the main work vehicle 1P or the sub work vehicle 1C or the unit may be disposed at a separate site.

Upon activation of this system, main-vehicle traveling path data is calculated from the main-vehicle position data generated with a predetermined sampling frequency (#a). At the time of work traveling, from the calculated main-vehicle traveling path data and sub-vehicle position data at each timing, work traveling target position data is calculated with consideration to the main-vehicle ground working width data and the sub-vehicle ground working width data and the above-described overlap OL (#b). Then, with this calculated work traveling target position data being used as a steering control target value, the sub work vehicle 1C is un-manned controlled to effect a wide ground work in cooperation with the main work vehicle 1P (#c). At the time of turn traveling, from the main turning starting data and the main turning ending data, turn traveling start position data and turn traveling end position data of the main work vehicle 1P are calculated (#d). Then, with taking the main-vehicle ground working width data and the sub-vehicle ground working width data into these calculated data, sub turn traveling path data is generated (#e). Incidentally, if the depth D of the turning area At is employed as a limiting condition at the time of generation of the sub turn traveling path data, contact between the sub work vehicle 1C and a ridge can be avoided in a reliable manner. From the generated sub turn traveling path data and the sub-vehicle position data at each timing, turn traveling target position data is calculated (#f). With using this calculated work traveling target position data as a steering control target value, the sub work vehicle 1C is un-manned controlled to effect an appropriate turn traveling within the turning area At (#g).

Figure 3:
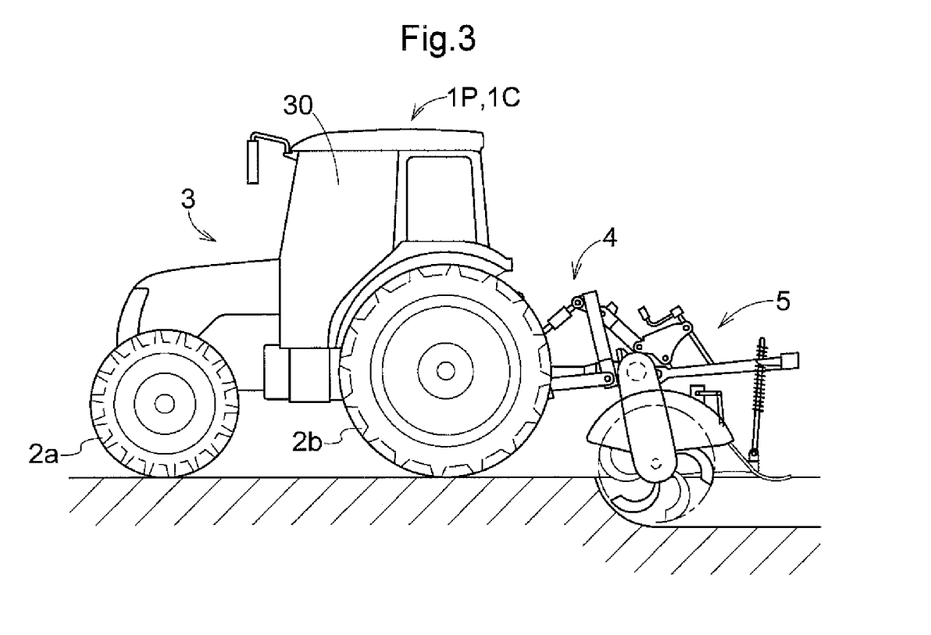
FIG. 3 is a side view showing a tractor equipped with a tilling implement applied as a work vehicle in an embodiment of the work vehicle coordinating system.

Next, a specific embodiment of the inventive work vehicle coordinating system will be explained. In this embodiment, work vehicles are tractors shown in FIG. 3 mounting a tilling implement for tilling an agricultural field demarked by a ridge. A main tractor 1P as a main work vehicle 1P and a sub tractor 1C as a sub work vehicle 1C are substantially identical, and a steering section 30 is formed at the center of a vehicle body 3 supported by front wheels 2a and rear wheels 2b. At a rear portion of the vehicle body 3, there is mounted, via a hydraulic lift mechanism 4, a tilling device 5 as a ground working implement. At the steering section 30 of the main tractor 1P and the sub tractor 1C respectively, there are provided, like the convention, a steering wheel, various kinds of control levers, a seat to be seated by a driver, etc. At the time of execution of a following control based on the inventive work vehicle coordinating system, the main tractor 1P will be controlled by a driver and the sub tractor 1C will be radio-controlled.

Figure 4:
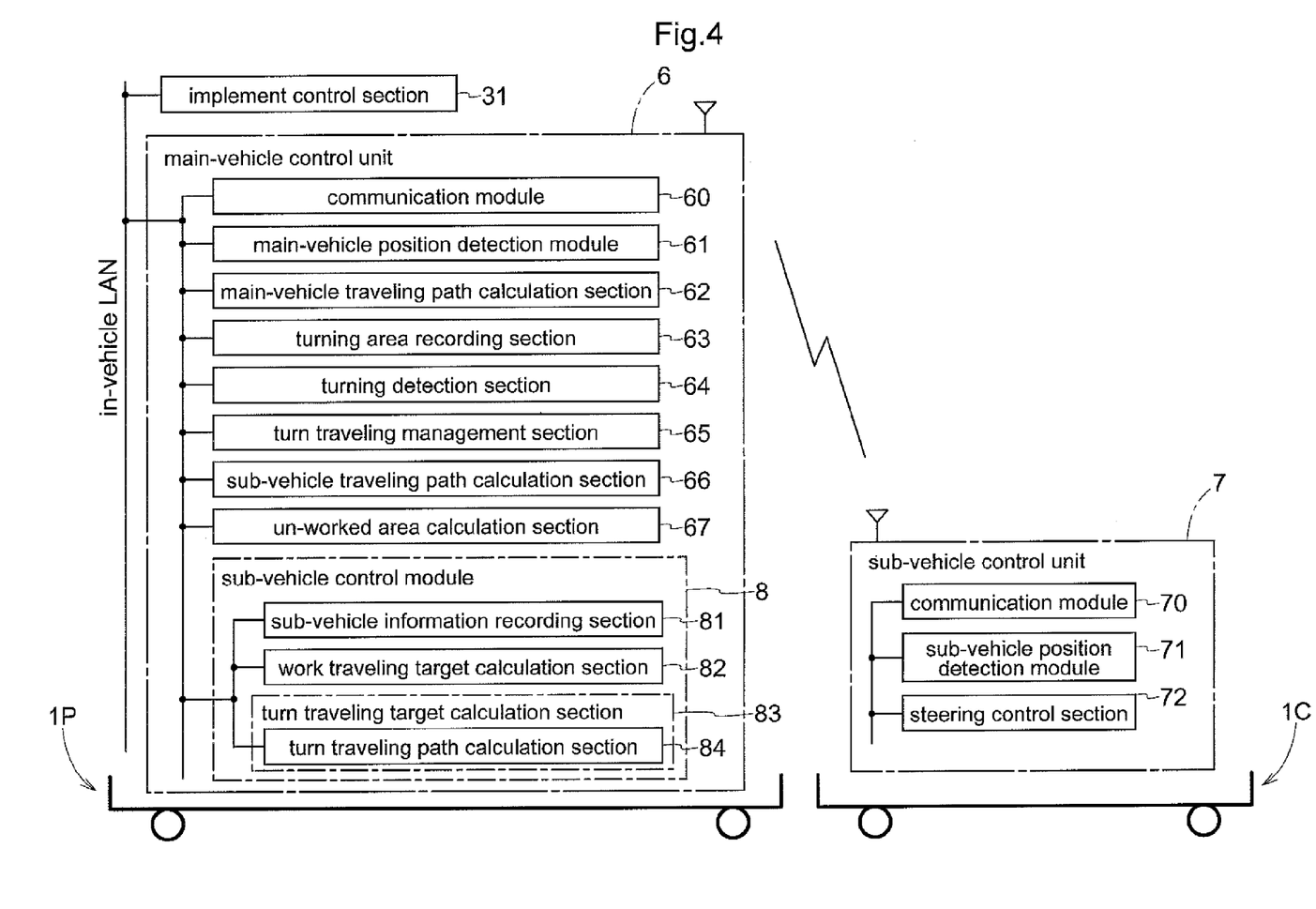
FIG. 4 is a functional block diagram showing functional sections together constituting the work vehicle coordinating system.

As shown in FIG. 4, in the instant embodiment, an electronic control unit for constituting the work vehicle coordinating system is divided into a main vehicle control unit 6 to be mounted on the main tractor 1P and a sub vehicle control unit 7 to be mounted on the sub tractor 1C. The main vehicle control unit 6 and the sub vehicle control unit 7 include communication modules 60 and 70 in order to allow wireless data transmission to/from each other.

The main vehicle control unit 6 includes functional sections such as a main-vehicle position detection module 61, a main-vehicle traveling path calculation section 62, a turning area recording section 63, a turning detection section 64, a turn traveling management section 65, and a sub vehicle control module 8. These functional sections sometimes effect operations in cooperation with hardware, but substantially are realized in response to start of a computer program.

The main-vehicle position detection module 61 detects a position of itself, that is, a position of the main tractor 1P, with utilization of GPS. The main-vehicle traveling path calculation section 62 calculates a traveling path of the main tractor 1P from a position detected by the main-vehicle position detection module 61. The turning area recording section 63 retrievably records an area created by a circumferential traveling of the main tractor 1P around an area to be ground worked thereby or a pre-existing area, as a turning area At, with the position or sizes thereof such as a depth being retrievable therefrom. Incidentally, in case such circumferential work traveling by the main work vehicle 1P is not carried out firstly, but lastly, there is no need to recording a turning area At created by a circumferential work traveling. So, this turning area recording section 63 can be omitted. However, there will still remain a need to retrievably record the depth D of the preset turning area At. The turning detection section 64 detects a turn traveling of the main work vehicle 1P at the turning area At in order to move from one work traveling to the next work traveling. The tilling implement 5 will be lifted up at the time of entrance from the work traveling to a turn traveling and will be lowered at the time of entrance from a turn traveling to a work traveling. These elevation and lowering of the tilling implement 5 are realized by lifting up/down movements of the lift mechanism 4 in response to control commands from an implement control section 31 mounted on the main tractor 1P. In the instant embodiment, the implement control section 31 is connected to the main vehicle control unit 6 via an in-vehicle LAN. So, operation commands of the implement control section 31 to the lift mechanism 4 are managed by the turn traveling management section 65. Therefore, the turning detection section 64 judges start of a turn traveling at the time of output of a lift-up command to the lift mechanism 4 and judges end of a turn traveling at the time of output of a lowering command to the same. That is, in this embodiment, the turning detection section 64 is configured to detect a turn traveling of the main tractor 1P based on an operational state of the tilling implement which effects a ground work.

A sub-vehicle information recording section 81 is a memory storing information relating to the sub tractor 1C. A work traveling target calculation section 82 calculates a target traveling position at the time of work traveling of the sub tractor 1C, based on a tilling width of the main tractor 1P, a tilling width of the sub tractor 1C, a work traveling path of the main tractor 1P and a position of the sub tractor 1C, with taking into consideration also an overlapping of tilling widths therebetween based on the above-described basic principle. A target traveling position calculated by the work traveling target calculating section 82 is outputted to the sub vehicle control unit 7.

A turn traveling target calculation section 83 incorporates a turn traveling path calculation section 84 for calculating a turn traveling path of the sub tractor 1C at the turning area based on a predetermined traveling path calculation algorithm. This traveling path calculation algorithm is to obtain a traveling path of the sub tractor with consideration to its turning radius, in such a manner as to connect a turn traveling start position and a turn traveling end position of the sub tractor 1C calculated respectively from the turn traveling start position and the turn traveling end position of the main tractor 1P. Alternatively, this can be an algorithm for obtaining in combination a turn traveling path and a straight traveling path which are set in advance. Such traveling path calculation algorisms are well-known in the art, so any such known algorism may be employed. And, the present invention is not limited to any particular algorithm. The turn traveling target calculation section 83 calculates a target traveling position based on a turn traveling path calculated by the turn traveling path calculation section 84 and a current position of the sub tractor 1C and then outputs the calculated target traveling position to the communication module 60 which then transmits this to the sub vehicle control unit 7.

The sub vehicle control unit 7 further includes a sub-vehicle position detection module 71 and a steering control section 72. Like the main-vehicle position detection module 61, the sub-vehicle position detection module 71 detects a self position, i.e. a position of the sub tractor 1C with utilization of the GPS. The obtained position data of the sub tractor 1C is transmitted via the communication module 70 to the main vehicle control unit 6. The steering control section 72 radiocontrols the sub tractor 1C to target traveling positions set one after another, by controlling steering of the front wheels 2a and driving of the rear wheels 2b of the sub tractor 1C, based on traveling target positions radio-transmitted from the sub vehicle control module 8 of the main vehicle control unit 6.

Incidentally, in the instant embodiment, the main vehicle control unit 6 further includes a sub-vehicle traveling path calculation section 66 and an un-worked area calculation section 67. The sub-vehicle traveling path calculation section 66 calculates traveling path of the sub tractor 1C from positions of the sub tractor 1C outputted and transmitted one after another from the sub-vehicle position detection module 71. The un-worked area calculation section 67 calculates a position of an un-worked area which is assumed to be unfinished for its ground tillage work, based on the main-vehicle traveling path calculated by the main-vehicle traveling path calculation section 62 and the sub-vehicle traveling path calculated by the sub-vehicle traveling path calculation section 66. With this, by cultivation of the un-worked work area when needed, a tilling work (a ground work) with high reliability can be realized.

Figure 5:
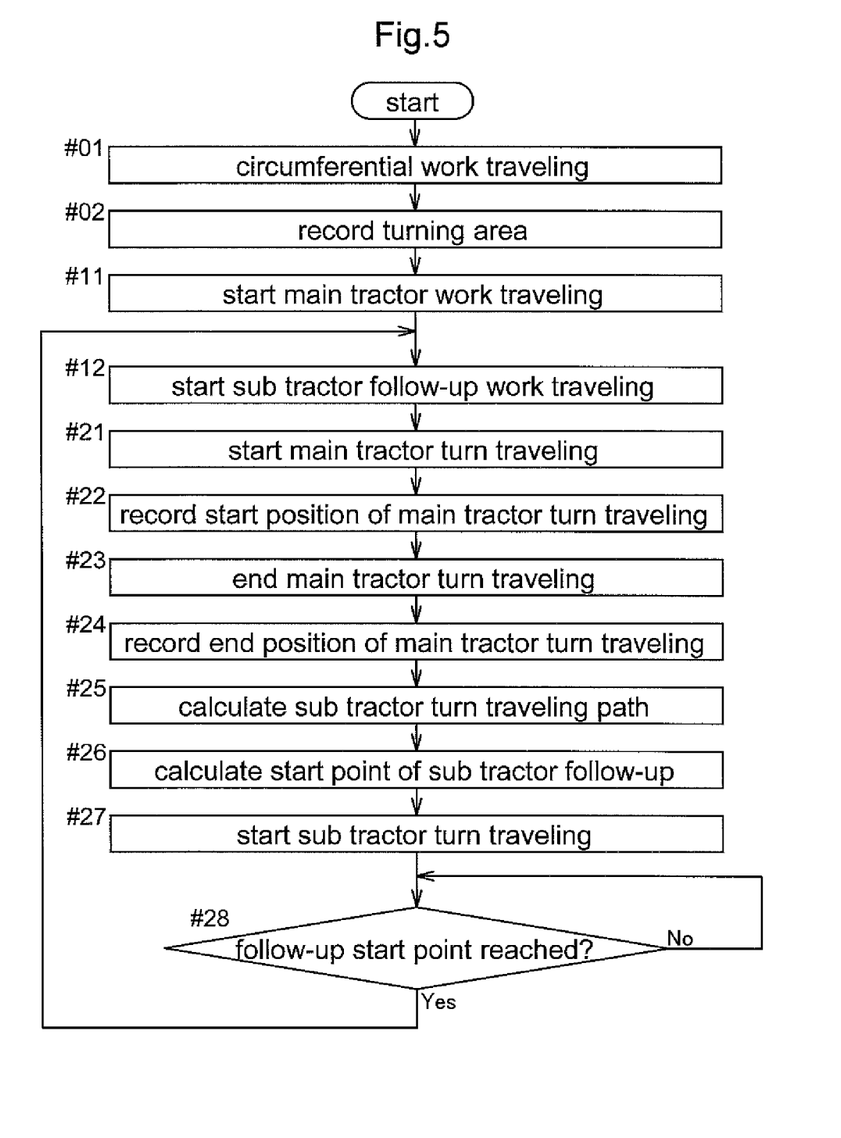
FIG. 5 is a flowchart illustrating one example of a control implemented in the work vehicle coordinating system.
Figure 6:
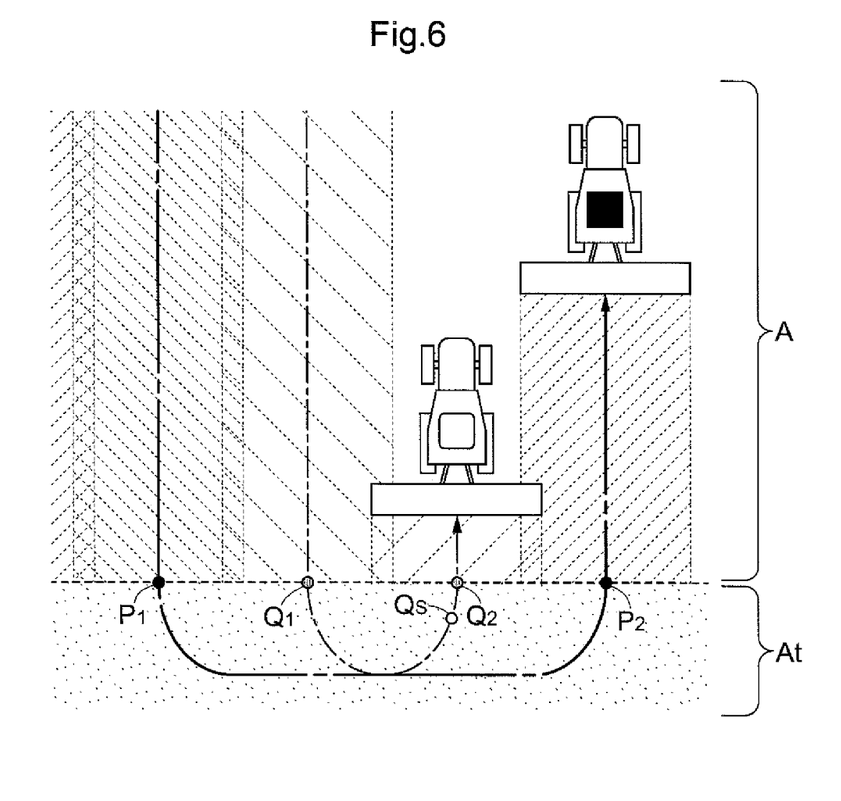
FIG. 6 is a diagram showing a traveling path of the main work vehicle during a turn traveling and a traveling route (a traveling path) of the sub work vehicle.

Next, with reference to the flowchart in FIG. 5, there will be explained an example of flow of control of coordinated traveling by the main tractor 1P and the sub tractor 1C according to the instant embodiment. FIG. 6 illustrates a mode of turn traveling of the main tractor 1P and the sub tractor 1C at a turning area At on one side.

In this embodiment, a circumferential work traveling is effected at first. Accordingly, firstly, a circumferential work traveling by the main tractor 1P along the ridge is carried out (#01). As a turning area At is created as a result of this circumferential work traveling, data such as a position relating to this turning area At are recorded (#02).

In succession, a work traveling (substantially a straight traveling) by the main tractor 1P is effected (#11). At the same time or with delay of a predetermined period, a follow-up work traveling by the sub tractor 1C is initiated (#12). When the main tractor 1P reaches the turning area At, the tilling implement 5 is lifted up and a turn traveling of the main tractor 1P is started (#21). The position of the main tractor 1P at this timing is recorded as a main turning start position P1 (#22). After the main tractor 1P effects the turn traveling and enters a ground work area A again, the tilling implement 5 is lowered and work traveling of the main tractor 1P is resumed (#23). And, the position of the main tractor 1P at this timing is recorded as a main turning end position P2 (#24). After the recording of the main turning start position P1 and the main turning end position P2, a sub turning start position Q1 and a sub turning end position Q2 of the sub tractor C1 are calculated. In the corresponding turning area At illustrated, with consideration to a lateral distance and an overlapping amount between the main tractor 1P and the sub tractor 1C, the sub turning start position Q1 will be set at a position offset from the main turning start position P1. The sub turning end position Q2 will be set at a position between the main turning end position P2 and the sub turning start position Q1, which is shown as an intermediate position in FIG. 6 for instance. Incidentally, in the other turning area Tu not shown, the positional relationship between the main turning start position P1, the main turning end position P2 and the sub turning start position Q1 and the sub turning end position Q2 are just reverse to the above, so that the sub turning end position Q2 will be set at a position further outward than the main turning end position P2, the tilling widths and the overlapping amount of the main tractor 1P and the sub tractor 1C will be obtained.

After calculations of the sub turning start position Q1 and the sub turning end position Q2, a sub turn traveling path from the sub turning start position Q1 to the sub turning end position Q2 is calculated (#25). Further, a position before the sub turning end position Q2 where the sub tractor C1 substantially reaches its directional posture for a work traveling is calculated as a follow-up start position Qs (#26). That is, this follow-up start position Qs is a position at which the work traveling path of the sub tractor 1C starting from the turning end position Q2 can correspond precisely to the work traveling path of the main tractor 1P.

After the sub tractor 1C reaches the sub turning start position Q1, the turn traveling of the sub tractor 1C is initiated (#27). In this turn traveling of the sub tractor 1C, the process checks whether the sub tractor 1C reaches the follow-up start position Qs or not (#28). Upon arrival at the follow-up start position Qs by the sub tractor 1P (YES branching at #28), the turn traveling of the sub tractor 1C is ended and the follow-up traveling of the sub tractor 1C, that is, a work traveling, is resumed (a jump to #12).

Incidentally, calculation of the turn traveling end point Q2 (a work traveling start point) is not made possible unless work traveling of the main work vehicle 1P is started after completion of its turn traveling. Hence, the distance between the main work vehicle 1P and the sub work vehicle 1C is set, with taking this into consideration. There is incorporated a standby control in which if the sub work vehicle 1C reaches the turning area At during turn traveling of the main work vehicle 1P, the sub work vehicle 1C is stopped at this position and is caused to stand by until completion of the ongoing turn traveling of the main work vehicle 1P. However, this control is omitted from this flowchart.

Further, although not described in this flowchart, the process constantly checks whether an ending command for this coordinated traveling control has been inputted or not. In response to input of an ending command for the coordinated traveling control, an ending process for this coordinated traveling control is effected as an interruption processing.

[Other Embodiments]

Figure 7:
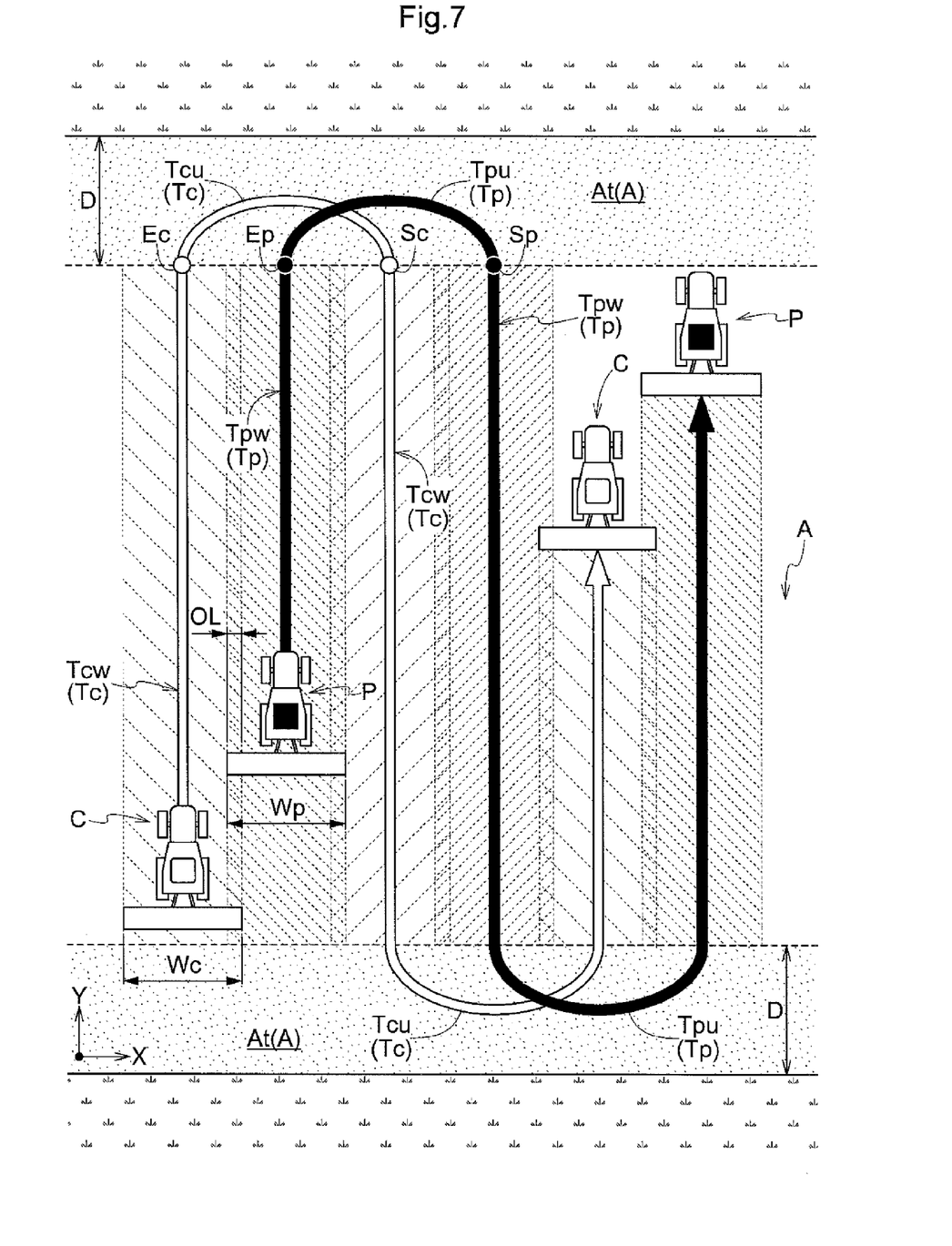
FIG. 7 is a diagram for explaining the follow-up relationship between the main work vehicle and the sub work vehicle in a further embodiment.

(1) In the work vehicle coordinating system of the present invention, the traveling paths are not limited to the traveling paths shown in FIG. 1 of the main tractor 1P and the sub tractor 1C. For instance, as shown in FIG. 7, it is possible to implement a traveling path configured such that the positional relationship of the sub tractor 1C relative to the main tractor 1P is reversed in the right/left direction between the forward work traveling and the reverse work traveling. In this traveling path, the turn traveling path too can be same for the main tractor 1P and the sub tractor 1C. However, in a turn traveling, it is difficult for the un-manned controlled sub tractor 1P to follow with precision a change in the position of the main tractor 1P which is man-controlled. Therefore, it is more advantageous for the sub tractor 1C to employ its own turn traveling path.

(2) In the foregoing embodiment, there was provided only one sub tractor 1C. However, the present invention can be applied to a plurality of sub tractors 1C with a similar controlling method. In that case, if two sub tractors 1C are provided, two follow-up control methods can be implemented. According to one of them, a first sub tractor 1C will be follow-up-controlled based on a path of the main tractor 1P with taking the working width of this main tractor 1P into consideration, and a second sub tractor 1C will be follow-up-controlled based on the path of the main tractor 1P with taking into consideration the working width of the first sub tractor 1C also. According to the other of them, the first sub tractor 1C will be follow-up-controlled based on the path of the main tractor 1P and the second sub tractor 1C will be follow-up-controlled relative to the first sub tractor 1C as "a main tractor 1P". Namely, in case a plurality of sub tractors 1C are provided, a follow-up control using a preceding sub tractor 1C as a "a main tractor 1P".

(3) In the foregoing embodiment, the main tractor 1P is configured as a manned-controlled type. Instead, this main tractor 1P too can be un-manned controlled with implementation of a programmed control technique or a remote controlled technique. The present invention is contemplated to be inclusive of a configuration in which the main tractor 1P, that is, the main work vehicle, too is un-manned controlled.

(4) In the foregoing embodiment, tractors mounting tilling implements 5 were used as work vehicles. The characterizing features of the present invention can be effectively utilized also when other work implement than the tilling implement 5, such as a spraying implement, a fertilizer distributor implement is mounted. Further alternatively, the present invention is applicable to other work vehicles, such as a combine, a rice planting machine, a mowing machine, a weeding machine, or a ground engineering machine such as a bulldozer, etc. Further, the main work vehicle and the sub work vehicle(s) need not be of a same type. For instance, a combine and a transporter truck can be used in combination.

(5) In such case where a ground work implement is a tilling implement or the like, the overlap OL which is the overlapping length between the main working width Wp and the sub working width Wc is basically an essential requirement. However, in the case of a spraying implement, a fertilizer distributor implement or the like, no overlap OL will be provided. Rather, a so-called underlap will be set with setting a predetermined distance between the main working width Wp and the sub working width Wc. Therefore, setting of an overlap OL is not an essential requirement in the present invention. Rather, what is essential is realization of follow-up control to maintain a predetermined range of path distance between the main work vehicle 1P and the sub work vehicle 1P relative to each other.

The invention claimed is:

1. A work vehicle coordinating system configured to carry out a ground work by a main work vehicle and an un-manned controlled sub work vehicle that follows up the main work vehicle, the system comprising:
a main-vehicle position detection module detecting a position of the main work vehicle;
a sub-vehicle position detection module detecting a position of the sub work vehicle;
a main-vehicle traveling path calculation section calculating a traveling path of the main work vehicle from the position of this main work vehicle;
a turning detection unit detecting a turn traveling of the main work vehicle in a turning area to shift from a first work traveling mode to a second work traveling mode;
a work traveling target calculation section calculating a target traveling position at time of a work traveling of the sub work vehicle, based on a ground working width of the main work vehicle, a ground working width of the sub work vehicle, a work traveling path of the main work vehicle and a position of the sub work vehicle;
a turn traveling target calculation section calculating a turn traveling path of the sub work vehicle in the turning area based on the ground working width of the main work vehicle, the ground working width of the sub work vehicle, a turn traveling start position and a turn traveling end position of the main work vehicle and calculating also a turn traveling target position of the sub work vehicle at the time of a turn traveling based on the turn traveling path; and
a steering control section for un-manned controlling the sub work vehicle based on the target traveling position.

2. A work vehicle coordinating system according to claim 1, wherein the turn traveling target calculation section calculates the turn traveling path, with a depth of the turning area being set as a limiting condition.

3. A work vehicle coordinating system according to claim 1, wherein ending of the turn traveling of the sub work vehicle is effected within the turning area, and follow-up by the sub work vehicle based on the work traveling path of the main work vehicle is effected before the work traveling.

4. A work vehicle coordinating system according to claim 1, wherein the system inhibits entrance of the sub work vehicle to the turning area during turn traveling of the main work vehicle.

5. A work vehicle coordinating system according to claim 1, further comprising:
a sub-vehicle traveling path calculation section calculating a traveling path of the sub work vehicle from the position of this sub work vehicle; and
an unworked position calculation section calculating a position of ground un-worked area, based on the traveling path of the main work vehicle and the traveling path of the sub work vehicle.

6. A work vehicle coordinating system according to claim 1, wherein the turning detection unit is configured to detect a turn traveling of the main work vehicle based on a non-working state of a ground work implement for effecting a ground work.

7. A work vehicle coordinating system according to claim 1, wherein:
the sub-vehicle position detection module and the steering control section are mounted on the sub work vehicle;
the main-vehicle position detection module, the main-vehicle traveling path calculation section, the turning detection section, the work traveling target calculation section and the turn traveling target calculation section are mounted on the main work vehicle; and
the sub work vehicle and the main work vehicle are connected to enable data transmission with each other.

8. A work vehicle coordinating system according to claim 1, wherein:
the sub-vehicle position detection module and the steering control section are mounted on the sub work vehicle;
the main-vehicle position detection module is mounted on the main work vehicle;
the main-vehicle traveling path calculation section, the turning detection section, the work traveling target calculation section, and the turn traveling target calculation section are provided as a separate control unit; and
the control unit, the sub work vehicle and the main work vehicle are connected to enable data transmission with each other.

9. A work vehicle coordinating system according to claim 1, wherein the main work vehicle is of a manned controlled type.

* * * * *